(12) United States Patent
Katsurabayashi et al.

(10) Patent No.: US 7,249,046 B1
(45) Date of Patent: Jul. 24, 2007

(54) OPTIMUM OPERATOR SELECTION SUPPORT SYSTEM

(75) Inventors: Hiroshi Katsurabayashi, Nakai-machi (JP); Hiroto Fukushima, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/386,339

(22) Filed: Aug. 31, 1999

(30) Foreign Application Priority Data

Oct. 9, 1998 (JP) .................................. 10-287173

(51) Int. Cl.
*G06F 9/46* (2006.01)
(52) U.S. Cl. ........................................................ 705/9
(58) Field of Classification Search .................... 705/9, 705/10, 8; 707/104, 5, 3; 709/229; 379/265
See application file for complete search history.

(56) References Cited

U.S. PATENT DOCUMENTS

| | | | | |
|---|---|---|---|---|
| 4,724,523 A | * | 2/1988 | Kucera | 715/532 |
| 4,773,009 A | * | 9/1988 | Kucera et al. | 715/531 |
| 4,864,501 A | * | 9/1989 | Kucera | 715/532 |
| 5,206,903 A | * | 4/1993 | Kohler et al. | 379/265.12 |
| 5,576,954 A | * | 11/1996 | Driscoll | 707/3 |
| 5,754,639 A | * | 5/1998 | Flockhart et al. | 379/266.05 |
| 5,825,869 A | * | 10/1998 | Brooks et al. | 707/104.1 |
| 5,884,270 A | * | 3/1999 | Walker et al. | 705/1 |
| 5,920,854 A | * | 7/1999 | Kirsch et al. | 707/3 |
| 5,983,216 A | * | 11/1999 | Kirsch et al. | 707/2 |
| 6,021,428 A | * | 2/2000 | Miloslavsky | 709/206 |
| 6,038,544 A | * | 3/2000 | Machin et al. | 707/5 |
| 6,115,709 A | * | 9/2000 | Gilmour et al. | 707/9 |
| 6,289,340 B1 | * | 9/2001 | Puram et al. | 705/7 |
| 6,356,632 B1 | * | 3/2002 | Foster et al. | 434/219 |
| 6,408,337 B1 | * | 6/2002 | Dietz et al. | 709/229 |
| 6,424,709 B1 | * | 7/2002 | Doyle et al. | 379/265.02 |
| 6,434,230 B1 | * | 8/2002 | Gabriel | 379/265.01 |
| 6,442,567 B1 | * | 8/2002 | Retallick et al. | 707/104.1 |

(Continued)

FOREIGN PATENT DOCUMENTS

JP     A-2-105973     4/1990

(Continued)

OTHER PUBLICATIONS

International Call Center Management website as archived on Feb. 12, 1998.*

(Continued)

*Primary Examiner*—Susanna M. Diaz
(74) *Attorney, Agent, or Firm*—Oliff & Berridge, PLC

(57) ABSTRACT

An optimum operator selection support system, executed by a computer, includes a document computer executable management part, a document feature computer executable extraction part, and a job feature computer executable extraction part. The document computer executable management part manages documents related to jobs stored by the computer, with additional information on operators who generated the documents. The document feature computer executable extraction part extracts a plurality of documents generated by a same operator from the document computer executable management part, and extracts features of the respective documents. The job feature computer executable extraction part extracts features of jobs of the operator by detecting common features based on a frequency of occurrence of terms in the plurality of documents extracted by the document feature computer executable extraction part.

21 Claims, 14 Drawing Sheets

U.S. PATENT DOCUMENTS

| | | |
|---|---|---|
| 6,453,038 B1 * | 9/2002 | McFarlane et al. .... 379/265.05 |
| 6,466,914 B2 * | 10/2002 | Mitsuoka et al. ............... 705/9 |
| 6,539,376 B1 * | 3/2003 | Sundaresan et al. ........... 707/5 |
| 6,581,105 B2 * | 6/2003 | Miloslavsky et al. ....... 709/238 |
| 2004/0133571 A1 * | 7/2004 | Horne et al. .................... 707/3 |
| 2004/0139042 A1 * | 7/2004 | Schirmer et al. ............... 707/1 |

FOREIGN PATENT DOCUMENTS

| | | |
|---|---|---|
| JP | A-2-158871 | 6/1990 |
| JP | A-5-298331 | 11/1993 |
| JP | A-6-95827 | 4/1994 |
| JP | A-9-212513 | 8/1997 |
| JP | A-10-28135 | 1/1998 |
| WO | WO99/34307 * | 7/1999 |

OTHER PUBLICATIONS

Shimazu et al. "Knowledge Discovery in Database by PROGOL—Design, Implementation and its Application to Expert System Building." SIG-FAI, vol. 25, pp. 88-104, 1996, Dialog File 94, Accession No. 02802145.*

* cited by examiner

FIG. 6

DOCUMENT 11

DOCUMENT FEATURE MANAGEMENT TABLE 21

| TERM | NUMBER OF OCCURRENCE | FREQUENCY OF OCCURRENCE | POWER OF FREQUENCY OF OCCURRENCE |
|---|---|---|---|
| USER | 30 | 13.4% | 10 |
| NETWORK | 22 | 9.8% | 8 |
| BOARD | 21 | 9.4% | 8 |
| SYSTEM | 14 | 6.3% | 3 |
| REALTIME | 14 | 6.3% | 7 |
| REMOTE | 13 | 5.8% | 8 |
| VOICE | 12 | 5.4% | 6 |
| EXPERIMENT | 12 | 5.4% | 3 |
| PRODUCT | 11 | 4.9% | 3 |
| SERVICE | 11 | 4.9% | 8 |
| SINGLE | 11 | 4.9% | 5 |
| Codec | 7 | 3.1% | 12 |
| MMComm | 6 | 2.7% | 100 |
| NP | 5 | 2.2% | 30 |
| DESKTOP | 5 | 2.2% | 5 |
| TELEWORK | 5 | 2.2% | 4 |
| IMAGE | 5 | 2.2% | 3 |
| CONFERENCE | 4 | 1.8% | 2 |
| JOINT | 4 | 1.8% | 6 |
| CUSTOMER | 4 | 1.8% | 3 |
| PERSON | 4 | 1.8% | 2 |

FIG. 7

DOCUMENT 12

DOCUMENT FEATURE MANAGEMENT TABLE 22

| TERM | NUMBER OF OCCURRENCE | FREQUENCY OF OCCURRENCE | POWER OF FREQUENCY OF OCCURRENCE |
|---|---|---|---|
| SYSTEM | 63 | 8.2% | 3 |
| DATA | 62 | 8.1% | 2 |
| PLACE | 61 | 8.0% | 10 |
| USER | 46 | 6.0% | 20 |
| OFFICE | 43 | 5.6% | 6 |
| SERVICE | 41 | 5.3% | 19 |
| SUPPORT | 37 | 4.8% | 3 |
| SYNCHRONISM | 36 | 4.7% | 9 |
| PROCESS | 33 | 4.3% | 5 |
| PRODUCT | 32 | 4.2% | 2 |
| PLATFORM | 32 | 4.2% | 46 |
| IDEA | 24 | 3.1% | 3 |
| SOFTWARE | 23 | 3.0% | 4 |
| TEAM | 22 | 2.9% | 9 |
| CONFERENCE | 22 | 2.9% | 11 |
| ENVIRONMENT | 20 | 2.6% | 6 |
| ASYNCHRONISM | 20 | 2.6% | 17 |
| IInterLocus | 16 | 2.1% | 89 |
| IKJ | 16 | 2.1% | 65 |
| FUNCTION | 15 | 2.0% | 5 |
| TIME | 13 | 1.7% | 2 |

FIG. 8

DOCUMENT FEATURE MANAGEMENT TABLE 23

DOCUMENT 13

| TERM | NUMBER OF OCCURRENCE | FREQUENCY OF OCCURRENCE | POWER OF FREQUENCY OF OCCURRENCE |
|---|---|---|---|
| SOFTWARE | 40 | 7.7% | 3 |
| COLOR | 32 | 6.1% | 7 |
| DRIVER | 32 | 6.1% | 26 |
| PRINTER | 32 | 6.1% | 4 |
| COLOR PRINTER | 31 | 5.9% | 12 |
| SERVICE | 29 | 5.6% | 17 |
| ESS | 24 | 4.6% | 37 |
| COLOR SYSTEM | 24 | 4.6% | 21 |
| DISPLAY | 23 | 4.4% | 4 |
| PRINT | 22 | 4.2% | 3 |
| USER | 21 | 4.0% | 15 |
| IMAGE QUALITY | 20 | 3.8% | 2 |
| DEVELOPMENT | 19 | 3.6% | 1 |
| COEFFICIENT | 18 | 3.4% | 3 |
| OUTPUT | 17 | 3.3% | 2 |
| GENERAL | 17 | 3.3% | 2 |
| COPY | 17 | 3.3% | 3 |
| Publishing | 16 | 3.1% | 16 |
| Server | 13 | 2.5% | 11 |
| PLIANT PRINTING | 12 | 2.3% | 98 |
| TRANSFER | 11 | 2.1% | 5 |

FIG. 9

JOB FEATURE MANAGEMENT TABLE
31

| RESPONSIBLE STAFF MEMBER | DOCUMENT (LINK TO DOCUMENT) | DOCUMENT FEATURE | COMMON FEATURE |
|---|---|---|---|
| KITAGAWA | DOCUMENT 11 | NETWORK, BOARD, SYSTEM, REALTIME, REMOTE, VOICE, EXPERIMENT, PRODUCT, SINGLE, Codec, MMComm, NP, DESKTOP, TELEWORK, IMAGE, CONFERENCE, JOINT, CUSTOMER, PERSON | SERVICE, USER |
| | DOCUMENT 12 | SYSTEM, DATA, PLACE, OFFICE, SUPPORT, SYNCHRONISM, PROCESS, PRODUCT, PLATFORM, IDEA, SOFTWARE, TEAM, CONFERENCE, ENVIRONMENT, ASYNCHRONISM, IInterLocus, IKJ, FUNCTION, TIME | |
| | DOCUMENT 13 | SOFTWARE, COLOR, DRIVER, PRINTER, COLOR PRINTER, ESS, COLOR SYSTEM, DISPLAY, PRINT, IMAGE QUALITY, DEVELOPMENT, COEFFICIENT, OUTPUT, GENERAL, COPY, PublishingServer, PLIANT PRINTING, TRANSFER | |
| KUNIYOSHI | DOCUMENT 21 | TABLE, STRUCTURIZATION, CELL, TREE STRUCTURE, VIEWING, SEARCH, EDITOR, DOCUMENT, ASYNCHRONISM, IInterLocus, IKJ, FUNCTION, TIME | BUSINESS MODEL, MARKET, CHARGING, EC |
| | DOCUMENT 22 | IMAGE SEARCH, Web, ABSTRACT, TAG, OFFICE, OFFICIAL GAZETTE, KNOWLEDGE, EDITOR, DOCUMENT, CONTENTS, IDEA, SOFTWARE TEAM | |
| KATSURAMORI | DOCUMENT 31 | LAYER, DISCUSSION, DATA, PLACE, OFFICE, SUPPORT, SYNCHRONISM, PROCESS, PRODUCT, IDEA, SOFTWARE TEAM, CONFERENCE, ENVIRONMENT, ASYNCHRONISM, IInterLocus, IKJ, FUNCTION, TIME | AIR VIEW, BIRD'S EYE VIEW, SYSTEM MODEL, CONFERENCE, DISCUSSION, SUPPORT |
| | DOCUMENT 32 | VIDEO, MULTIMEDIA, SWITCH, NETWORK, REMOTE CONFERENCE, EXPERIMENT, PRODUCT, SINGLE, Codec, MMComm, DESKTOP, TELEWORK, IMAGE, CONFERENCE | |
| | DOCUMENT 33 | SECURITY, CHARGE, CODE, DES, RSA, ELLIPTIC FUNCTION, SET INFORMATION PROCESS, COPYRIGHT, INTERNET, CONTENTS, IDEA, SOFTWARE, TEAM, CONFERENCE, ENVIRONMENT, ASYNCHRONISM | |
| ... | ... | ... | ... |

FIG. 10

ORDER RELATION MANAGEMENT TABLE
41

| Job ID | ORDERER | UNDERTAKER | JOB NAME | RELATED DOCUMENT ID | RESULTED DOCUMENT ID | STATUS | RELATED JOB ID |
|---|---|---|---|---|---|---|---|
| 1 | KITAGAWA | KATSURAMORI | STUDY OF SYSTEM CONFIGURATION | Twin.001, Twin.002, Twin.003 | Twin.102 | APPROVAL OF COMPLETION | ------ |
| 2 | KITAGAWA | KUNIYOSHI | STUDY OF BUSINESS MODEL | Twin.011, Twin.012 | Twin.111 | UNDERTAKING | ------ |
| 3 | KITAGAWA | KATSURAMORI | STUDY OF RESEARCH INITIATIVE | ------ | | DIVISION OF JOB | 5, 6 |
| 4 | KITAGAWA | KUNIYOSHI | BUSINESS INITIATIVE | Twin.041 | | TRANSFER | 7 |
| 5 | KATSURAMORI | TAKEO | STUDY OF DISPLAY | Twin.021, Twin.022, Twin.023 | | UNDERTAKING | |
| 6 | KATSURAMORI | KURONEKO | STUDY OF STRUCTURIZATION | Twin.031, Twin.032, Twin.033 | | UNDERTAKING | |
| 7 | KUNIYOSHI | MATSUSHITA | BUSINESS INITIATIVE | Twin.041, Twin.052, Twin.053 | | UNDERTAKING | |
| 8 | ... | ... | ... | ... | ... | ... | ... |

FIG. 11

ORDER RELATION
ANALYSIS RESULT TABLE
42

| FIRST LEVEL | SECOND LEVEL | RELATED JOB 1 | THIRD LEVEL | RELATED JOB 2 |
|---|---|---|---|---|
| KITAGAWA | KATSURAMORI | 1, 3 | TAKEO | 5 |
|  | KUNIYOSHI | 2, 4 | KURONEKO | 6 |

FIG. 12

CONVERSATION RELATION MANAGEMENT TABLE 51

| PROJECT NO. | ORIGINATOR | RECEIVER | NUMBER OF TIMES |
|---|---|---|---|
| 1 | KITAGAWA | KATSURAMORI | 34 |
| | | KUNIYOSHI | 15 |
| | | TAKEO | 5 |
| | | KURONEKO | 8 |
| | KATSURAMORI | KITAGAWA | 52 |
| | | KUNIYOSHI | 5 |
| | | TAKEO | 20 |
| | | KURONEKO | 18 |
| | KUNIYOSHI | KITAGAWA | 28 |
| | | KUNIYOSHI | 7 |
| | | TAKEO | 2 |
| | | KURONEKO | 3 |
| | TAKEO | KITAGAWA | 8 |
| | | KUNIYOSHI | 34 |
| | | TAKEO | 1 |
| | | KURONEKO | 7 |
| | KURONEKO | KITAGAWA | 3 |
| | | KUNIYOSHI | 43 |
| | | TAKEO | 1 |
| | | KURONEKO | 8 |
| 2 | KITAGAWA | KUNIYOSHI | 36 |
| | KUNIYOSHI | KITAGAWA | 39 |

FIG. 13

STAFF-MEMBER BASED JOB FEATURE MANAGEMENT TABLE 32

| RESPONSIBLE STAFF MEMBER | CLASSIFICATION | FEATURE OF GENERATED DOCUMENT GROUP | EXTRACTED JOB | ROLE |
|---|---|---|---|---|
| KATSURAMORI | ENTIRE PROJECT | DISCUSSION SUPPORT, NON-STRUCTURE ... | SYSTEM DESIGN | INTERMEDIATE LEADER, TECHNICAL LEADER |
| | 1, 3, 5, 6 | DISCUSSION SYSTEM, SYSTEM DESIGN, DEVELOPMENT ... | SYSTEM DESIGN | INTERMEDIATE LEADER, TECHNICAL LEADER |
| | 9, 12, 13 | NEEDS, SURVEY | CATWOE ANALYSIS | RESPONSIBLE STAFF MEMBER |
| KITAGAWA | ENTIRE PROJECT | PLAN, REPORT, BUDGET ... | PLAN, NEGOTIATION | PROJECT LEADER |
| | 1, 2, 3 | NEEDS, CUSTOMER, ANALYSIS ... | SURVEY, REQUEST ANALYSIS | TECHNICAL LEADER |
| ... | ... | ... | ... | ... |

OPTIMUM OPERATOR SELECTION SUPPORT SYSTEM

BACKGROUND OF THE INVENTION

1. Field of the Invention

The present invention relates to an optimum operator selection support system, and more particularly, to an optimum operator selection support system which provides information on individual capabilities of operators by utilizing results of jobs executed by the operators while transmitting/receiving electronic information via computers.

2. Description of the Related Art

Upon initiation of a new project or the like, it is necessary to find optimum persons based on the contents of past job experiences. In a small-scale organization, the manager can grasp characteristics of respective members, however, in a large-scale organization, it is difficult for the manager to grasp characteristics of all the members. Accordingly, it has been considered to grasp the contents of jobs of respective members by using a computer or the like, and to utilize the information to develop human resources. The technique for this purpose will be described below.

Apparatuses and methods to find optimum persons by searching pre-registered personal database are known. For example, Japanese Published Unexamined Patent Application No. Hei 5-298331 discloses a decision making support system in which a database is searched based on an input condition, and significant information is extracted from information obtained from the search based on the input condition. By this arrangement, a decision can be easily made based on the information stored in the database. Upon selection of project members, the decision making support system inputs various conditions from workstations. The system generates an SQL (Structured Query Language) access sentence based on the input conditions, and searches the personal database. Further, the system gives scores to respective candidates obtained from the personal database based on the personal information obtained from the personal database and the input conditions set in a condition table. Then, the system selects candidates as the project members based on the scores of the respective candidates. More specifically, names, employee codes, mail addresses, technical fields, licenses, specialties, current jobs, significance and the like are inputted into the personal database by a generator of the database. Searches are performed based on the data.

Further, apparatuses to select appropriate persons from status of use of computers are known. For example, Japanese Published Unexamined Patent Application No. Hei 6-95827 discloses a guide apparatus which introduces appropriate skilled workers by storing jobs and functions performed by users with their skill levels. The guide apparatus comprises a function skill levels judgment unit that judges skill levels of respective users with respect to an application software program to run on information processing devices used by the users, personal information storage unit that contains personal information of the respective users, a function skill level storage unit that contains skill levels as outputs from the function skill level judgment unit, an inquiry function input unit that inputs information on a function of the application software program which an operator desires to know, a skilled worker search unit that searches for skilled workers regarding the function that the operator desires to know, inputted at the inquiry function input unit, by utilizing skill level information in the skill level storage unit, and a search result output unit that outputs the result of the search by the skilled worker search unit, with personal information stored in the personal information storage unit.

Further, apparatuses and methods to select persons interested in a particular item from information of past contribution to net news or the like are known. For example, Japanese Published Unexamined Patent Application No. Hei 10-28135 discloses a discussion-group generation support system which automatically selects candidates of members of a discussion group based on the degree of correspondence between a subject set by a discussion group promoter and data originated by network users, by providing a discussion group setting part, a candidate selection part and an initiation notification delivery part. In this system, the discussion group setting part sets a content to be discussed by users. The candidate selection part collects users originated data corresponding to the content as candidates of the member of the discussion group. The initiation notification delivery part delivers a document calling for participation in the discussion to the collected users.

Further, as an apparatus to analyze jobs conducted by a person and extracts feature of the jobs, an apparatus which extracts features of documents generated by work of a person is considered. A plural document feature extracting apparatuses have been already considered. One known example of these apparatuses is an apparatus which extracts features of a document with keywords each frequently appears in each field. For example, Japanese Published Unexamined Patent Application No. Hei 2-105973 discloses an automatic document analysis apparatus having a field-based term score table describing keywords each frequently appears in each field and a field-based meaning category score table describing meaning categories of the terms each of which frequently appears in each field. Keywords appeared in an analysis object document and meaning categories of the keywords are analyzed by using the field-based term score table and the field-based meaning category score table, and the class of the analysis object document is determined. By this arrangement, even when a term which has a concept the same as that of a term representing the feature of a field (field-based term) appears in a different character string in an unanalyzed document, the term can be recognized as a term belonging to the same set.

Further, apparatuses to examine similarity between documents and classify the documents are known. For example, Japanese Published Unexamined Patent Application No. Hei 2-158871 discloses a document analysis apparatus which obtains concept feature amounts of respective documents from frequency values of keywords included in the documents and classifies the documents in accordance with the concept feature amounts by providing a keyword information amount storage part, a concept feature extraction part and an inter-document distance calculation part.

Further, apparatuses to record topics to which users accessed and obtain document features based on the frequencies of the topics are known. For example, Japanese Published Unexamined Patent Application No. Hei 9-212513 discloses a book information display apparatus in which an access frequency measurement unit counts the numbers of times of access to information on topics by a user from an information selection unit, then the numbers are compared with a threshold value to extract a representative topic, and the topics are stored into a representative information temporary storage unit. The structure of information related to the representative topic is determined by a representative information hierarchy determination unit based on the representative topic. Then, when a timer starts, a book information synthesizing unit synthesizes the information into a document and displays it, in a book form, on an information display unit.

However, the conventional techniques respectively have the following problems.

In the apparatus to search a personal database (e.g., the decision making support system disclosed in Japanese Published Unexamined Patent Application No. Hei 5-298331) it takes much time to analyze and evaluate the jobs of respective members and construct a database with the obtained information. Further, the contents of the jobs cannot be necessarily analyzed exactly. Further, as the contents of the jobs are often expressed with abstract words, the amount of information necessary for on-the target determination is insufficient for selection of members from a plurality of candidates.

In the system to search for skilled workers in accordance with skill levels regarding application software program (e.g., the guide apparatus disclosed in Japanese Published Unexamined Patent Application No. Hei 6-95827), even if skill levels regarding an application software program can be judged, the judged levels cannot be directly utilized for determination of features and roles of a job without difficulty.

In the system to select persons interested in similar matters based on information originated by users as past contribution to net news, electronic-mail news, WWW (World Wide Web) and the like, (e.g., the discussion-group generation support system disclosed in Japanese Published Unexamined Patent Application No. Hei 10-28135), persons who use many of terms related to a topic and persons who often use the terms can be selected, however, the selection cannot necessarily lead to analysis of jobs, roles and degree of contribution of these persons.

In the apparatus to examine keywords each of which appears in each field in a document and meaning categories of the keywords, and to classify a sentence, having the same concept of that in a field-based term score table but not using the same terms, into the same field of the score table (e.g., the automatic document analysis apparatus disclosed in Japanese Published Unexamined Patent Application No. Hei 2-105973), the features of the document can be obtained, however, the features of a task (job), roles of operator of the task and the like cannot be extracted without difficulty. For example, in a case where an operator performs a task to survey the method for proceeding development of a plurality of products, documents are often arranged for each example of developed products. In this case, the features of each document represent the features of each product. However, the feature of the task and that of the operator's job are the survey on the method for proceeding development. In this manner, the actual job content may differ from the analysis result.

In the apparatus to obtain concept feature amounts of respective documents from frequency values of keywords included in the documents (e.g., the document analysis apparatus disclosed in Japanese Published Unexamined Patent Application No. Hei 2-158871), similarity between documents can be obtained, however, the features of tasks in which documents have been generated, the roles of the operators of the tasks and the like cannot be extracted without difficulty.

In the apparatus to classify documents based on relation between the documents and accessed topics in the documents (e.g., the book information display apparatus disclosed in Japanese Published Unexamined Patent Application No. Hei 9-212513), the relations between documents and accessed topics can be obtained. However, even a close relation exists between a document with a topic, if the topic has not been accessed, the relation cannot be obtained. That is, the relations cannot necessarily represent the features of the documents. Further, to represent the features of a document, it is necessary to wait for a statistically-significant amount of access. Further, as the degree of relation between a topic and a document is not considered, every single access to a topic is processed with the same weight regardless of the degree of relation between the topic and the document. Accordingly, a broad-ranged feature of the document is registered. Further, upon access to a document, a topic related to the access may not be clarified. Otherwise, in a case where the information of the document has been recently provided for common use and it has not been accessed many times, the features of the document cannot be extracted. Further, even if the features of the document can be represented, the features of a task related to the document, the role of the operator in the task and the like cannot be extracted without difficulty.

SUMMARY OF THE INVENTION

The present invention has been made in consideration of the above drawbacks, and has its object to provide an optimum operator selection support system which extracts information exactly representing features of jobs of an operator by analyzing records of jobs by the operator.

Further, another object of the present invention is to provide a computer-readable recording medium containing an optimum operator selection support program for extracting information exactly representing features of jobs of an operator by analyzing records of jobs by the operator.

To attain the foregoing objects, the present invention provides, as a first aspect of the invention, an optimum operator selection support system which provides determination standards for selecting optimum operators of a job, comprising: a document management part that manages documents related to jobs, with additional information on operators who generated the documents; a document feature extraction part that extracts a plurality of documents generated by one operator from the document management part, and extracts features of the respective documents; and a job feature extraction part that extracts features of jobs of the operator by detecting common features of the plurality of documents extracted by the document feature extraction part.

According to the optimum operator selection support system as the first aspect of the invention, the document feature extraction part extracts a plurality of documents generated by an operator from documents managed by the document management part, and further, extracts features of the respective extracted documents. Then, the job feature extraction part extracts features of jobs of the operator by detecting common features of the plurality of documents extracted by the document feature extraction part, as the features of the jobs of the operator who generated the documents.

Further, the present invention provides, as a second aspect of the invention, an optimum operator selection support system which provides determination standards for selecting optimum operators of a job, comprising: a task management part that analyzes job order relations based on electronic data transmitted/received among operators, and manages information on the job order relations; and a job feature extraction part that extracts roles of the operators to perform jobs, from job order relations extracted by the task management part.

According to the optimum operator selection support system as the second aspect of the invention, the task management part analyzes job order relations based on electronic data transmitted/received among operators, and manages information on the job order relations. Then, the job feature extraction part extracts roles of operators for executing a job from the job order relations extracted by the task management part.

Further, the present invention provides, as a third aspect of the invention, an optimum operator selection support system which provides determination standards for selecting optimum operators of a job, comprising: a conversation management part that collects conversation information among operators by utilizing electronic data, and manages the collected conversation information; a conversation feature extraction part that extracts features of the conversations among the operators managed by the conversation management part; and a job feature extraction part that extracts features of jobs of the operators, from distribution of the conversations extracted by the conversation management part.

According to the optimum operator selection support system as the third aspect of the invention, the conversation management part collects conversation information among operators by utilizing electronic data and manages the collected conversation information. Next, the conversation feature extraction part extracts features of conversations among the operators managed by the conversation management part. Then, the job feature extraction part extracts features of jobs of the operators, from distribution of the conversations extracted by the conversation management part.

Further, the present invention provides, as a computer-readable recording medium containing an optimum operator selection support program according to the first aspect of the invention, a computer-readable recording medium containing an optimum operator selection support program to provide determination standards for selecting optimum operators of a job, the program causing a computer to function as: a document management part that manages documents related to jobs, with additional information on operators who generated the documents; a document feature extraction part that extracts a plurality of documents generated by one operator from the document management part, and extracts features of the respective documents; and a job feature extraction part that extracts features of jobs of the operator by detecting common features of the plurality of documents extracted by the document feature extraction part.

By executing the optimum operator selection support program contained in the above recording medium by a computer, a construction necessary for the above first optimum operator selection support system is formed on the computer.

Further, the present invention provides, as a computer-readable recording medium containing an optimum operator selection support program according to the second aspect of the invention, a computer-readable recording medium containing an optimum operator selection support program to provide determination standards for selecting optimum operators of a job, the program causing a computer to function as: a task management part that analyzes job order relations based on electronic data transmitted/received among operators, and manages information on the job order relations; and a job feature extraction part that extracts roles of the operators to perform jobs, from job order relations extracted by the task management part.

By executing the optimum operator selection support program contained in the above recording medium by a computer, a construction necessary for the above second optimum operator selection support system is formed on the computer.

Further, the present invention provides, as a computer-readable recording medium containing an optimum operator selection support program according to the third aspect of the invention, a computer-readable recording medium containing an optimum operator selection support system which provides determination standards for selecting optimum operators of a job, the program causing a computer to function as: a conversation management part that collects conversation information among operators by utilizing electronic data, and manages the collected conversation information; a conversation feature extraction part that extracts features of the conversations among the operators managed by the conversation management part; and a job feature extraction part that extracts features of jobs of the operators, from distribution of the conversations extracted by the conversation management part.

By executing the optimum operator selection support program contained in the above recording medium by a computer, a construction necessary for the above third optimum operator selection support system is formed on the computer.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an example of a document feature management table generated from a "document 11";

FIG. 7 is an example of a document feature management table generated from a "document 12";

FIG. 8 is an example of a document feature management table generated from a "document 13";

FIG. 9 is an example of a job feature management table;

FIG. 10 is an example of an order relation management table;

FIG. 11 is an example of an order relation analysis result table;

FIG. 12 is an example of a conversation relation management table;

FIG. 13 is an example of a staff-member based job feature management table; and

DETAILED DESCRIPTION OF THE PREFERRED EMBODIMENTS

Hereinbelow, a preferred embodiment of the present invention will now be described in accordance with the accompanying drawings.

Figure 1:
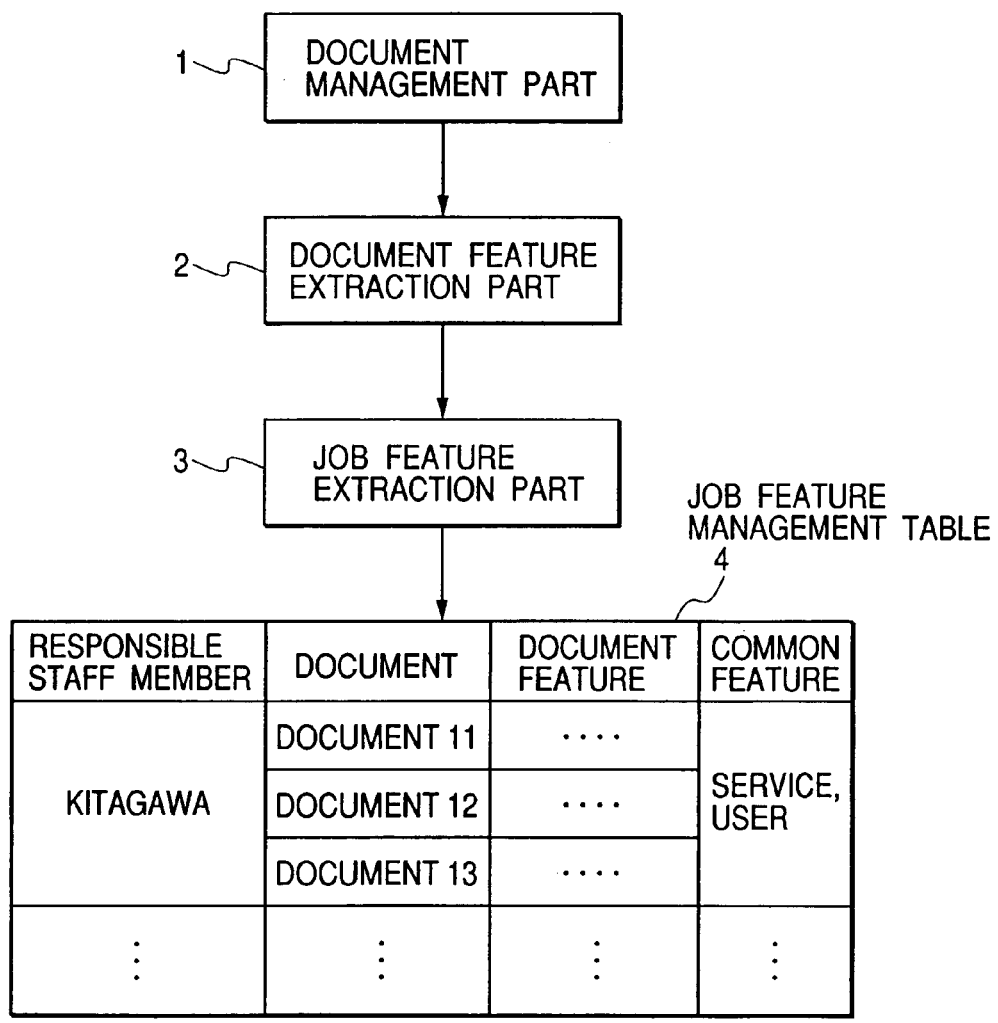
FIG. 1 is a block diagram showing the principle of the present invention.

FIG. 1 is a block diagram showing the principle of the present invention. An optimum operator selection support system of the present invention comprises a document management part 1, a document feature extraction part 2 and a job feature extraction part 3. The document management part 1 manages documents related to jobs, with additional information on operators who generated the documents. The document feature extraction part 2 extracts a plurality of documents generated by one operator from the document management part 1, and extracts features of the respective extracted documents. The job feature extraction part 3 extracts features of the jobs of the operator by detecting features common to the plurality of documents extracted by the document feature extraction part 2.

According to the optimum operator selection support system as above, first, the document feature extraction part 2 extracts a plurality of documents generated by an operator from documents managed by the document management part 1, and further extracts features of the respective documents. Then, the job feature extraction part 3 extracts the features of the operator who generated these documents by detecting features common to the plurality of documents extracted by the document feature extraction part 2. As a result, a job feature management table 4 is generated. The features common to the plurality of documents generated by the one responsible staff member are registered in the job feature management table 4.

By referring to the job feature management table 4, jobs of respective responsible staff members can be exactly detected. That is, features, which might be lost in other information by merely analyzing individual documents, can be extracted by searching overlap portions of the plurality of documents.

Hereinbelow, the embodiment of the present invention will be described in more detail.

Figure 2:
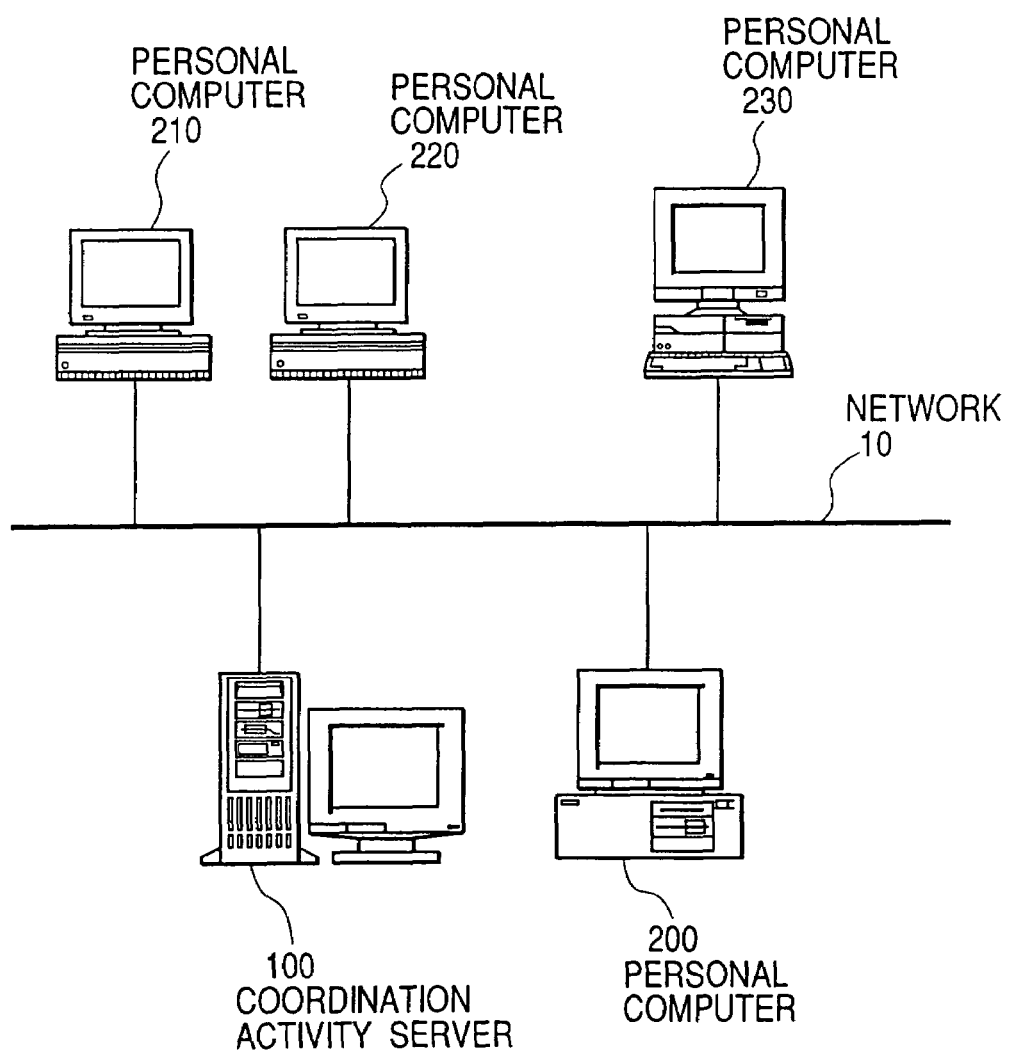
FIG. 2 is a diagram showing the system configuration of an embodiment of the present invention.

FIG. 2 is a diagram showing the system configuration of the embodiment of the present invention. The optimum operator selection support system comprises a coordination activity server 100 and a plurality of personal computers 200, 210, 220 and 230 operated by operators. The server and the computers are interconnected via a network 10. Note that the network 10 may be constructed with an Ethernet and a telephone line. Further, the connection between the coordination activity server 100 and the personal computers 200, 210, 220 and 230 can be made by serial ports such as RS232C, parallel ports, infrared light and the like, as long as data transmission can be made therebetween. Further, the coordination activity server 100 and the personal computers 200, 210, 220 and 230 may be pack aged in a single case, and interconnected with an internal bus of a computer.

Figure 3:
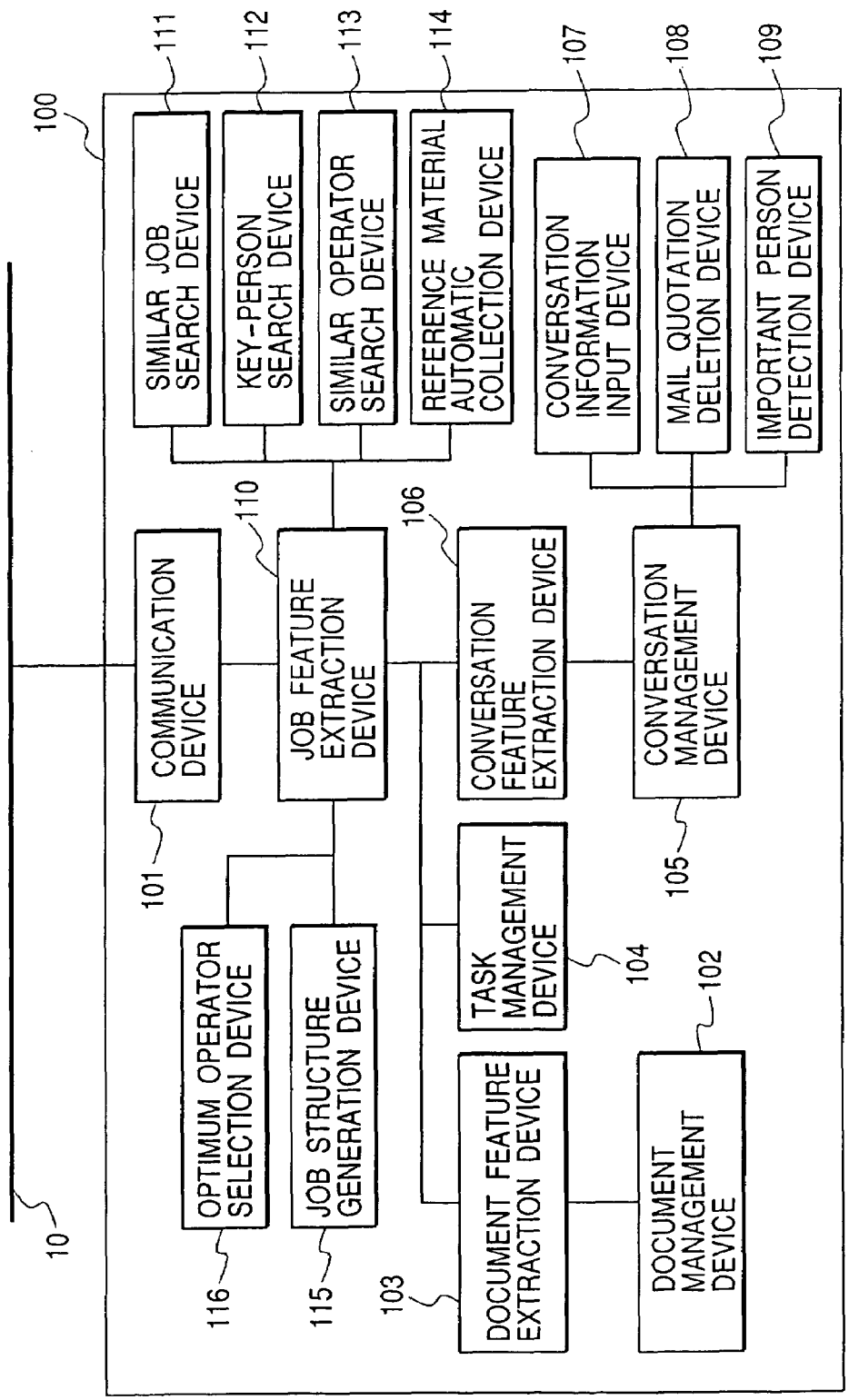
FIG. 3 is a block diagram showing the internal construction of a coordination activity server.

FIG. 3 is a block diagram showing the internal construction of the coordination activity server 100. The coordination activity server 100 comprises a communication device 101, a document management device 102, a document feature extraction device 103, a task management device 104, a conversation management device 105, a conversation feature extraction device 106, a conversation information input device 107, a mail quotation deletion device 108, an important person detection device 109, a job feature extraction device 110, a similar job search device 111, a key-person search device 112, a similar operator search device 113, a reference material automatic collection device 114, a job structure generation device 115 and an optimum operator selection device 116.

The communication device 101 performs communication for data exchange with the personal computers 200, 210, 220 and 230 operated by users. The communication device 101 is connected to the network 10.

The document management device 102 enables a plurality of operators involved in a job to share document information. For this purpose, the document management device 102 stores document information, presents an index of the stored document information, controls access right, downloads a document to a personal computer by a user, and uploads a document from a personal computer. In the present embodiment, the document management device 102 manages operations with respect to a document such as reference, copying, moving, partial copying, partial moving, deletion and partial deletion, or provides operation information.

The document feature extraction device 103 extracts features of a document from frequencies of occurrence of terms used in the document by morphemic analysis or the like. The features of the document may be extracted by, as well as simple survey on frequencies of occurrence of used terms, storing frequencies of occurrence of terms used in a general document as reference values in advance and extracting the features of the document from the differences between the surveyed frequencies of occurrence and the reference values. Further, frequencies of occurrence of typical terms by specialty may be obtained in place of the frequencies of occurrence in a general document. In this case, the task management device 104 or the like, which manages jobs each conducted by a plurality of operators, may clarify the specialty of each task. Or the specialty of a task may be extracted from a document group used in the task. Further, relations between similar terms may be registered in advance, so as to treat different terms representing the same concept as the same terms, or to reduce errors due to variation in notation.

The task management device 104 analyzes job order relations based on electronic data transmitted/received among a plurality of operators when a job is conducted by the plurality of operators, and manages information on the job order relations. In the present embodiment, statuses of job order relations are "Order", "Undertaking", "Transfer", "Refusal", "Report of Completion", "Approval of Completion", "Division of Job", "Combination of Jobs", "Suspension of Job", and "Single Job". When an operator who has not undertaken but voluntarily conducted a job, the status of job order relation is "Single Job". If the job has some relation with another job, the job is combined with the other job, and the status of job order relation becomes "Combination of Jobs".

The conversation management device 105 manages transmission/reception of electronic mails. In the present embodiment, a mail server corresponding to IMAP4 (Internet Message Access Protocol 4) is employed. However, a POP3 (Post Office Protocol 3) mail server may be employed as long as the server records transmission history. If the POP3 mail server cannot record transmission history, the conversation feature extraction device 106 must record the history. Further, the conversation management device 105 may be constructed with a private branch exchange (PBX) of a telephone line as well as an electronic-mail server. In this case, the conversation feature extraction device 106 receives line exchange records as conversation information from the PBX. Further, a synchronizing-type conversation support system server such as a NETMEETING (trademark of Microsoft Co., Ltd.) by Microsoft Co., Ltd. may be used.

The conversational feature extraction device 106 analyzes persons who had conversations, the numbers and frequencies of conversations, from conversation information obtained from the conversation management device 105. Further, if document information used in each conversation can be obtained, the conversation feature extraction device 106 records the information. The document information used in conversation may include electronic mail text, attached materials, documents used by a display image-share type soft such as NETMEETING, and the contents of conversations by a chatting software program. Note that in an electronic mail or the like, a sender may quote the content of another person's remark and write his/her opinion following the quotation. In such case, the quotation portion and the portion written by the sender are separated and features of both portions may be distinguished from each other. In this case, the personal computer displays the features of both of the quotation portion and the portion written by the sender such that they are distinguished form each other. Note that to extract the features of the quotation portion, the function of the mail quotation deletion device 108 to be described later must be stopped.

The conversation information input device 107 allows the users to input conversations which have not been captured by the conversation management device 105 into the conversation feature extraction device 106 so as to utilize the input information similarly to automatically collected information for analysis.

In a case where the conversation management device 105 manages electronic mails, when feature extraction by morphemic analysis is performed on a main text of an electronic mail to extract terms, the mail quotation deletion device 108 deletes a quotation from another person's remark in the mail before the feature extraction is performed, so as to remove the quotation from the object of the morphemic analysis. The quotation portion is detected by, e.g., regarding a portion with quotation marks ">" or the like, which a mail system automatically attached to the portion upon response, as a quotation.

The important person detection device 109 extracts particular members of a project, who are not project members, and persons who had conversations with mail text or attached documents having features close to the contents of roles of the members, as important persons.

The job feature extraction device 110 analyzes a document group generated in a project, job order relations, distribution of conversations and the like, to extract roles, responsible fields, ways of proceeding jobs, and the like, of persons in the project.

The similar job search device 111 searches information extracted by the job feature extraction device 110, and selects similar jobs and persons who conducted the jobs, or a project in which the jobs occurred. The similar jobs are detected by searching an object field, ways of proceeding jobs and the like. The ways of proceeding jobs are judged by flows and features of jobs.

The key-person search device 112 extracts a person substantially greatly contributed to a project. The key person may be detected by a key-person searching to detect a person who made communication with most of persons who were involved in the project, as a coordinator who played a leading part. Further, the jobs may be classified based on similarity, and a person who was concerned with most of the classified items may be judged as a person who knows the project from a broad view and who played a leading part.

Further, the jobs may be classified based on similarity, and a person who was concerned with most of the classified items may be judged as a technical leader who played a leading part. Further, the key person may be judged by a key-person searching to determine a person who is in the top position in job order relations as a project leader who played a leading part.

The similar operator search device 113 searches information extracted by the job feature extraction device 110 to select persons who played similar roles. The roles include, e.g., a leader, an intermediate leader, an intermediate leader of project, a leader of program implementation team, responsible staff members of experiment and evaluation. In this manner, searches can be performed based on combinations of job classification, jobs, relations among operators in a project, staff management elements (amounts of management jobs).

The reference material automatic collection device 114 analyzes jobs which have been conducted in a designated project, and detects past or current similar jobs. Then, the reference material automatic collection device 114 automatically selects documents used in the similar jobs, and notifies a user of reference materials.

The job structure generation device 115 structurizes command relations, job order relations, conversation amounts, roles, responsible fields and the like, based on information from the job feature extraction device 110, as a job structure. The structurization is made by, e.g., generating an association diagram representing a job structure based on roles of the job, and describing features of generated documents extracted from the respective roles and generated documents in the diagram.

The optimum operator selection device 116 inputs requirements for persons necessary for the user, and selects optimum candidates based on the feature information extracted by the job feature extraction device 110. The requirements may include roles and responsible fields.

Figure 4:
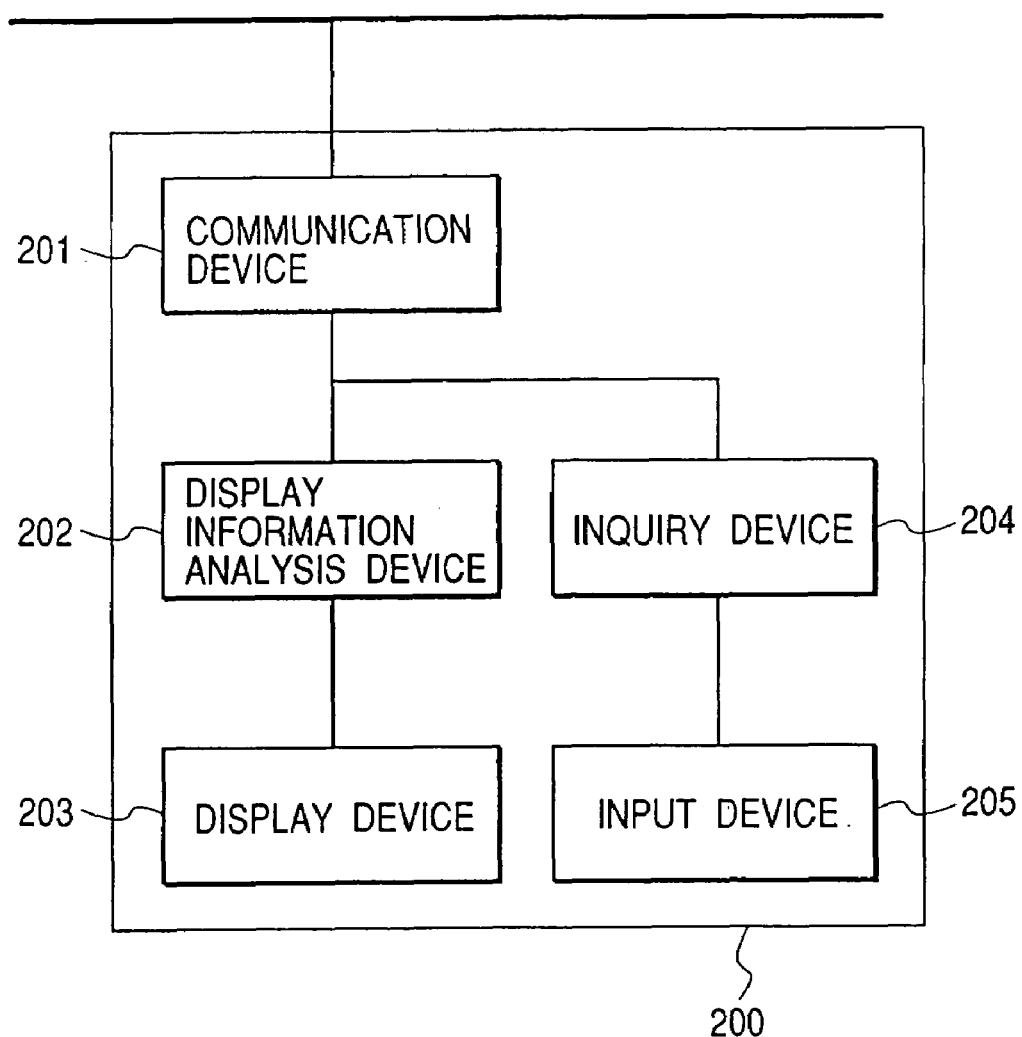
FIG. 4 is a block diagram showing the internal construction of a personal computer.

FIG. 4 is a block diagram showing the internal construction of the personal computer. The personal computer 200 comprises a communication device 201, a display information analysis device 202, a display device 203, an inquiry device 204 and an input device 205.

The communication device 201 performs communication for data exchange and the like with the coordination activity server 100. The communication device 201 may be connected to an Ethernet, a network constructed with a telephone line, or an internal bus of a computer. Further, the communication device 201 may be connected to other computers via serial ports, parallel ports, infrared light or the like.

The display information analysis device 202 analyzes information, returned as a result of inquiry to the coordination activity server 100, such that the information can be displayed clearly to the user; and send the information to the display device 203. For example, within a job conducted by a plurality of operators, the display information analysis device 202 generates a graph showing documents with which arbitrary persons were concerned and features of the documents, and sends the graph to the display device 203.

The inquiry device 204 generates information for the user's inquiry to the coordination activity server 100 and holds a user interface.

In the present embodiment, the user makes inquiries and obtains responses with respect to the coordination activity server 100 from the personal computers 200, 210, 220 and 230 via the network 10. However, these devices may be included in the same computer.

Then, processing in the optimum operator selection support system having the above construction will be described below.

First, processing to extract job features of respective responsible staff members by using the optimum operator selection support system will be described. To extract the job features of the responsible staff members, documents generated by the staff members must be analyzed and features of the documents must be extracted. The document feature extraction device 103 extracts the document features.

Figure 5:
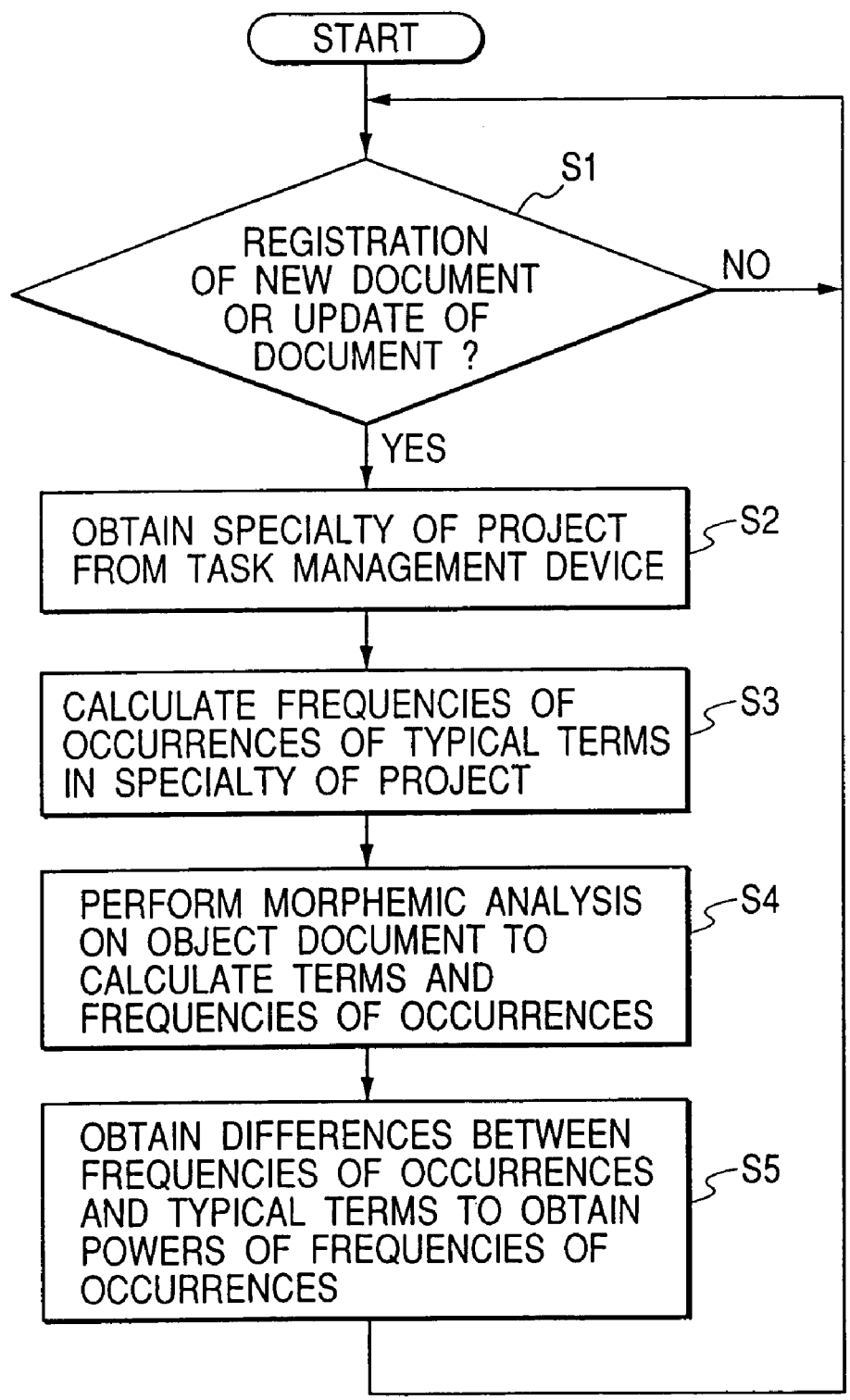
FIG. 5 is a flowchart showing the processing by a document feature extraction device.

FIG. 5 is a flowchart showing the content of processing by the document feature extraction device. The processing is always performed when the coordination activity server 100 is on. All the processing described below is performed by the document feature extraction device 103.

[S1] Input/output with respect to the document management device 102 is monitored to determine whether or not new document registration or update of document has occurred. If any processing has occurred, the process proceeds to step S2, otherwise, step S1 is repeated, thus the input/output with respect to the document management device 102 is continuously monitored.

[S2] The specialty of a project to which a newly generated document belongs is obtained from the task management device 104.

[S3] Frequencies of occurrence of typical terms in the specialty of the project are calculated.

[S4] Morphemic analysis is performed on an object document to extract terms, and frequencies of occurrence of the terms are calculated.

[S5] Regarding terms extracted from the object document, powers of frequencies of occurrence representing how many times larger the frequencies of occurrence are than those of the typical terms are obtained. When the processing has been completed, a document feature management table is generated, and the process returns to step S1.

The document feature extraction device 103 holds the generated document feature management table. Next, an example of document feature management table generated from a document generated by a user Kitagawa will be described.

FIG. 6 shows a document feature management table 21 generated from a "document 11". FIG. 7 shows a document feature management table 22 generated from a "document 12". FIG. 8 shows a document feature management table 23 generated from a "document 13". The document management tables 21 to 23 have items "Term", "Number of Occurrence", "Frequency of Occurrence" and "Power of Frequency of Occurrence".

The item "Term" shows terms extracted from a document by morphemic analysis. As the terms, only nouns, or combinations of nouns and verbs may be extracted. The item "Number of Occurrence" shows how many times the terms appear in the document. The item "Frequency of Occurrence" shows percentages obtained by dividing the numbers of occurrence of terms by the total number of terms in the document and multiplying the divided numbers by 100. The item "Power of Frequency of Occurrence" shows powers of frequencies of occurrence of the terms with respect to those of typical terms in a case where those of typical terms have been registered in advance. For example, if the frequency of occurrence of a typical term in a specialty is 2% while the frequency in a processing object document is 4%, the power of the frequency of occurrence is 2.

The job feature extraction device 110 extracts features of jobs of each person based on the document feature management tables as above. More specifically, the document feature management tables based on a plurality of documents generated by a user regarding a particular project are compared with each other, and terms common to the plurality of document feature management tables are extracted. For example, in case of document feature management tables 21 to 23 as shown in FIGS. 6 to 8, as two terms "service" and "user" are registered in all the document feature management tables 21 to 23, these terms are extracted. The job feature extraction device 110 holds the extraction result in a job feature management table.

FIG. 9 is an example of the job feature management table. In FIG. 9, a job feature management table 31 has items "Responsible Staff Member", "Document (Link to Document)", "Document Feature" and "Common Feature".

The item "Responsible Staff Member" shows names of project members. The item "Document (Link to Document)" shows names of documents generated by the responsible staff members or identifiers of the documents when they are managed by the document management device 102. The item "Document Feature" shows features obtained by morphemic analysis or the like on the documents, i.e., terms frequently used in the documents. The item "Common Feature" shows terms commonly used in the documents generated by one responsible staff member.

Note that the common features may be extracted from a document group by job, as well as from all the documents generated by the responsible staff members. Further, features of documents used among persons who had conversations may be extracted. Further, common features in a document group in one order relation (transfer, division of job, combination of jobs or the like) may be extracted. Further, as job features, features may be extracted by each job and similar jobs may be extracted based on the extracted features, for job classification.

In this manner, by extracting common features of a plurality of documents generated by each responsible staff member, the contents of jobs of the staff member can be grasped with precision higher than that in analysis based on individual documents.

For example, in case of documents generated by a person who makes a survey on prior art before filing a patent application, the field of conventional techniques to be examined changes in correspondence with the content of the invention proposed by the inventor. For this reason, if the invention relates to computer memory access, terms "memory", "CPU" and the like frequently appear in a generated report on the survey result. If the invention relates to a laser device, terms "laser oscillator", "laser light" and the like frequently appear in a generated report on the survey result. If these reports are individually analyzed, "development of computer and laser device" is obtained as a job types of the person. On the other hand, if common features are extracted from a plurality of reports on the surveys, terms "invention", "prior art", "patentability", "difference" and the like may be extracted. In consideration of meanings of these terms, it can be understood that the person's job is prior art survey.

As a reference to determine an individual capability, as well as information on fields of experienced jobs, information on positions in projects is useful. For example, upon initiation of a new project, a leader is usually selected from persons who have been leaders of other projects and persons who experienced positions corresponding to the leaders. The positions of the respective staff members in past projects can be discriminated by analyzing job order relations. The task management device 104 manages the job order relations.

FIG. 10 is an example of the order relation management table. In FIG. 10, an order relation management table 41 has items "Job ID", "Orderer", "Undertaker", "Job Name", "Related Document ID", "Resulted Document ID", "Status" and "Related Job ID".

The item "Job ID" shows identifies of jobs managed by the task management device 104. The item "Orderer" shows orderers of the jobs. The item "Undertaker" shows persons who were asked to do the jobs. The number of undertakers per each job may be two or more. The item "Related Document ID" shows the ID of a document related to each job. In this example, IDs identified by the document management device 102 are used. The item "Resulted Document ID" shows documents generated as results of the jobs. In this example, IDs identified by the document management device 102 are used. The item "Status" shows current statuses of progress of job order relations. The statuses of job order relations include "Order", "Undertaking", "Transfer", "Refusal", "Report of Completion", "Approval of Completion", "Division of Job", "Combination of Jobs", "Suspension of Job", and "Single Job". The item "Related Job ID" shows identifiers in the task management device 104 related to the respective jobs. The identifiers are registered as job identifiers related to division or transfer of job.

The contents of the order relation management table 41 are updated by the task management device 104 each time a job order is made between users. The job feature extraction device 110 analyzes the order relation management table 41, and generates an order relation analysis result table by project.

FIG. 11 is an example of the order relation analysis result table. In FIG. 11, an order relation analysis result table 42 has items of authority levels of responsible staff members and related jobs. An item "First Level" shows persons in top positions in job order relations. An item "Second Level" shows persons in the second positions from the top in the job order relations. An item "Related Job 1" shows identifiers of orders from the first level persons to the second level persons, managed by the task management device 104. An item "Third Level" shows persons in the third positions from the top in the job order relations. An item "Related Job 2" shows identifiers of job orders from the second level persons to the third level persons, managed by the task management device 104.

By referring to the order relation analysis result table 42, the roles of the respective staff members within a project can be understood. In the example of FIG. 11, a staff member "Kitagawa" is a project leader, and staff members "Katsuramori" and "Kuniyoshi" are intermediate leaders.

Next, the processing to analyze jobs of respective staff members from conversations via mails and the like will be described.

When an electronic mail or the like is transmitted/received on the network 10, the conversation management device 105 collects the content of the electronic mail. Further, information inputted from the conversation information input device 107 is handled as similar information to information of electronic mail, and collected by the conversation management device 105. The conversation feature extraction device 106 analyzes the contents of the collected information, and extracts information on originators, receivers and the like. The conversation feature extraction device 106 holds the extracted information as a conversation relation management table.

FIG. 12 is an example of the conversational relation management table. In FIG. 12, a conversation relation management table 51 has items "Project No.", "Originator", "Receiver" and "Number of Times".

The item "Project No." shows identifiers of series of jobs conducted by a plurality of operators as members for a certain purpose. In each project, a plurality of jobs occur. Further, in the present embodiment, projects and members are managed by the task management device. The item "Originator" shows persons who initiated a conversation in the respective projects. In case of electronic mail, the originator corresponds to a mail sender. In case of telephone, the originator corresponds to a call originator. The item "Receiver" shows persons who received an electronic mail or the like from the originator. The item "Number of Times" shows the numbers of times of conversations occurred in the respective projects.

Note that the mail quotation deletion device 108 analyzes the contents of the electronic mails collected by the conversation management device 105, and deletes quotations from others' remarks, then the conversation feature extraction device 106 holds the quotation-deleted electronic mails. Further, the important person detection device 109 determines whether or not electronic mails or the like are transmitted/received with members other than project members. If there is such a person, the important person detection device 109 analyzes the content of the electronic mail or the like, and determines whether or not the person plays an important part. If the person plays an important part, the person is determined as an important person. The information on the important person is sent in response to a request to the personal computers 200, 210, 220 and 230, and displayed on the display screens of the personal computers.

Further, the job feature extraction device 110 generates a staff-member based job feature management table based on the contents of the job feature management table 31, the order relation analysis result table 42 and the conversation relation management table 51.

FIG. 13 is an example of the staff-member based job feature management table. In FIG. 13, a staff-member based job feature management table 32 has items "Responsible Staff Member", "Classification", "Feature of Generated Document Group", "Extracted Job" and "Role".

The item "Responsible Staff Member" shows names of members of the project. The item "Classification" shows job IDs of the jobs related to the responsible staff members. Note that information on the role of each responsible staff member in the entire project is classified as "Entire Project". The item "Feature of Generated Document Group" shows features obtained by document morphemic analysis or the like, i.e., terms frequently used in the respective documents. The item "Extracted Job" shows contents of jobs or jobs in projects. The item "Role" shows positions in the jobs and the projects.

In a state where the various data as described above are held in the coordination activity server 100, when a user of one of the personal computers 200, 210, 220, 230 issues a request to display roles of the respective staff members of a project, the request is sent to the job feature extraction device 110 in the coordination activity server 100. The job feature extraction device 110 analyzes the held various data, and specifies the roles and order relations of the respective staff members. Then, the job feature extraction device 110 sends the analysis result to the job structure generation device 115. The job structure generation device 115 generates data structurized such that the features of the jobs of the respective staff members and job order relations among the respective staff members can be understood only at a glance. The generated data is sent to the personal computer, and the display information analysis device 202 analyzes the content of the data. As a result of the analysis, image information is generated, and displayed on the display device 203.

Figure 14:
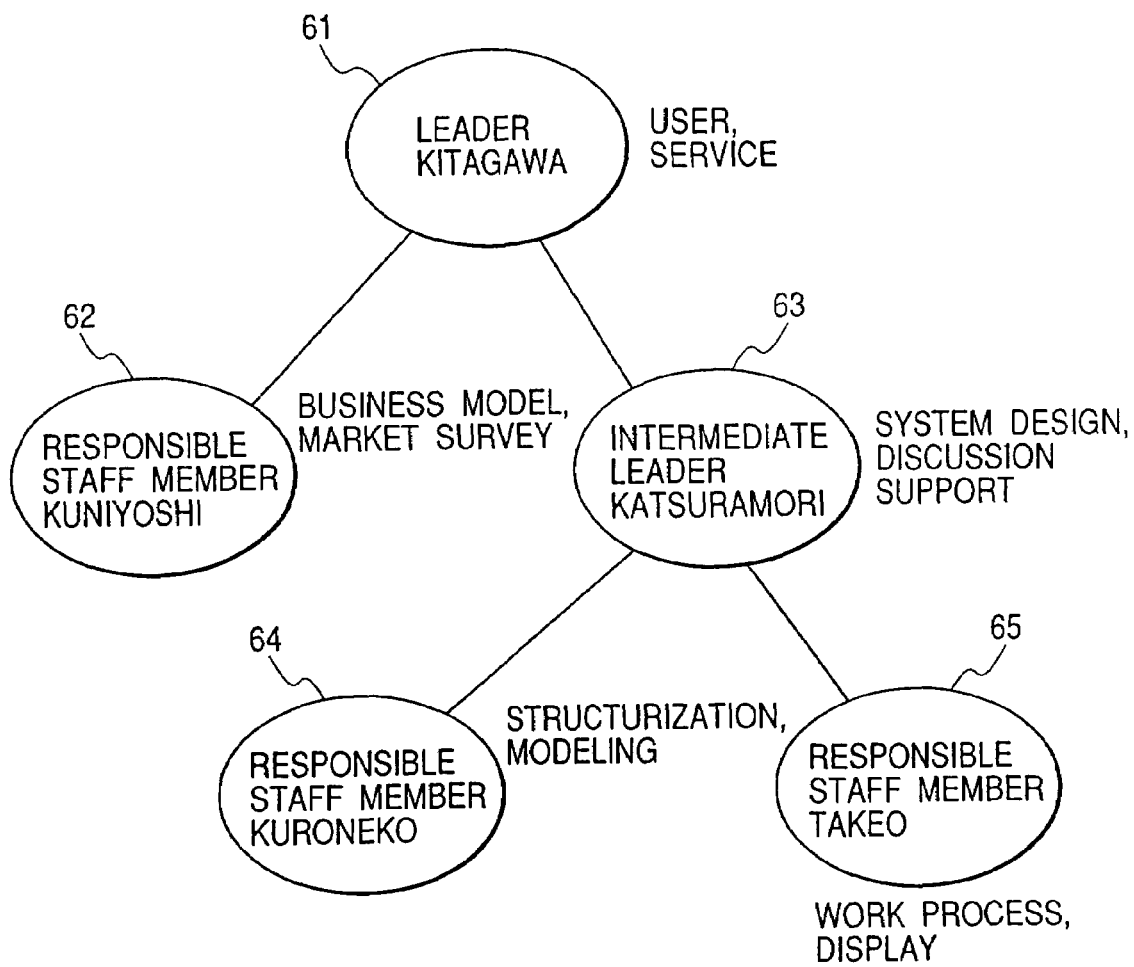
FIG. 14 is a display image example of a job structure.

FIG. 14 is a display image example of job structure. As shown in FIG. 14, the job order relations are represented with a tree structure by using nodes 61 to 65 corresponding to the respective responsible staff members. A node in an upper position means a job-ordering side staff member while a node in an lower position means a job-ordered side staff member. Common features extracted from documents generated by the respective staff members are shown around the nodes 61 to 65.

In this manner, by conducting general work in an electronic environment, jobs can be automatically analyzed. By this arrangement, human resources, results of similar jobs and ways of proceeding jobs can be understood by widely utilizing job information, without manually generating personal job history database. Thus, know-how of the organization can be utilized. Further, key persons of the respective projects can be known from various viewpoints, and an appropriate person to whom an inquiry should be made can be easily known. Further, as a job structure can be seen, a job can be conducted with reference to a project by others, or the operator of a job can look back and improve his/her way of proceeding of the job.

Note that the above processing functions can be implemented by a computer. In this case, the contents of the processing of the functions to be included in the optimum operator selection support system are described in a program stored in a computer-readable recording medium. Then, the above processing can be implemented by the computer by executing the program. As the computer-readable recording medium, a magnetic recording device, a semiconductor memory and the like may be used. In case of placing the program on the market, the program may be stored in a portable recording medium such as a CD-ROM (Compact Disk Read Only Memory) or a floppy disk and introduced on the market. Further, the program may be stored into a computer storage device connected to a network, and the program may be transferred to another computer via the network. When the program is executed by the computer, the program is stored in a hard disk device in advance, and loaded to a main memory and executed there.

As described above, in the optimum operator selection support system as the first aspect of the present invention, as features common to a plurality of documents generated by one operator can be detected, features which could not be found in analysis of individual documents can be extracted.

Further, in the optimum operator selection support system as the second aspect of the present invention, the roles of operators for execution of jobs are extracted from job order relations, very useful information for finding e.g. a person who experienced the role of project leader can be provided.

Further, in the optimum operator selection support system as the third aspect of the present invention, as the features of jobs of the respective operators are extracted from the features of conversations among the operators, the contents of the jobs can be grasped from various viewpoints, and more exact judgment can be made.

Further, in a computer-readable recording medium containing the optimum operator selection support program according to the first aspect of the present invention, the processing to detect features common to a plurality of documents generated by one operator can be implemented by executing the recorded optimum operator selection support program by the computer.

Further, in a computer-readable recording medium containing the optimum operator selection support program according to the second aspect of the present invention, the processing to extract the roles of the operator for executing the jobs can be implemented by the computer by executing the recorded optimum operator selection support program by the computer.

Further, in a computer-readable recording medium containing the optimum operator selection support program according to the third aspect of the present invention, the processing to extract the features of jobs of the respective operators from the features of the conversations among the operators can be implemented by executing the recorded optimum operator selection support program by the computer.

As many apparently widely different embodiments of the present invention can be made without departing from the spirit and scope thereof, it is to be understood that the invention is not limited to the specific embodiments thereof except as defined in the appended claims.

What is claimed is:

1. A computer executing an optimum operator selection support system, comprising:
   a document computer executable management part that manages a plurality of documents stored by the computer related to a plurality of jobs, with additional information on a plurality of operators who generated the plurality of documents;
   a document feature computer executable extraction part that extracts operator-specific documents generated by one of the plurality of operators from the document computer executable management part, and extracts a plurality of features of the operator-specific documents for the one of the plurality of operators; and
   a job feature computer executable extraction part that extracts job features from the plurality of features by detecting common features based on a frequency of occurrence of terms in the operator-specific documents extracted by the document feature computer executable extraction part, wherein the document computer executable management part identifies an operator as the optimum operator for an assigned task based on the job features;
   a job structure computer executable generation part that generates a structure representing roles of the plurality of operators related to a job, wherein the job structure computer executable generation part generates an association diagram showing the job based on roles in the job, and describes the roles of the plurality of operators and features extracted from generated documents in the association diagram.

2. The computer according to claim 1, further comprising:
   a conversation computer executable management part that manages conversations among the plurality of operators by utilizing electronic data; and
   a conversation feature computer executable extraction part that extracts conversation features from the conversations managed by the conversation computer executable management part,
   wherein the job feature computer executable extraction part extracts the job features from the operator-specific documents extracted by the document feature computer executable extraction part and extracts a distribution of the conversations managed by the conversation computer executable management part.

3. The computer according to claim 2, further comprising a key-person computer executable search part that searches for an operator who has frequently performed communication with most of the plurality of operators of a job, from information extracted by the conversation feature computer executable extraction part, and determines the operator who has frequently performed communication as a key person who played a leading role in a job handled by the plurality of operators.

4. The computer according to claim 2, wherein the conversation computer executable management part further includes a conversation information computer executable input part that inputs conversation information which has not been automatically obtained by the conversation computer executable management part, and wherein the conversation computer executable management part handles the conversation information inputted by the conversation information computer executable input part similarly to the electronic data.

5. The computer according to claim 2, further comprising a mail quotation computer executable detection and deletion part that deletes a quotation from another operator's remark, from conversations managed by the conversation computer executable management part.

6. The computer according to claim 2, wherein the conversation feature computer executable extraction part separately extracts features of a quotation from another operator's remark and a newly-written remark.

7. The computer according to claim 2, further comprising an important member computer executable detection part that detects a person who is not registered by the conversation computer executable management part as a member to conduct a job but significantly related to the job for execution of the job.

8. The computer according to claim 1, further comprising a task computer executable management part that analyzes job order relations based on electronic data transmitted/received among the plurality of operators, and manages information on the job order relations, wherein the job feature computer executable extraction part extracts the job features and roles of the plurality of operators based on the plurality of features of operator-specific documents extracted by the document feature computer executable extraction part and the information on the job order relations managed by the task computer executable management part.

9. The computer according to claim 8, further comprising:

a conversation computer executable management part that manages conversations among the plurality of operators by utilizing electronic data; and a conversation feature computer executable extraction part that extracts conversation features from the conversations managed by the conversation computer executable management part, wherein the job feature computer executable extraction part extracts the job features from the operator-specific documents extracted by the document feature computer executable extraction part, extracts a distribution of the conversations managed by the conversation computer executable management part, and extracts the roles of the plurality of operators from the information on the job order relations managed by the task computer executable management part.

10. The computer according to claim 1, further comprising:

a computer executable inquiry part that makes an inquiry to the job feature computer executable extraction part; and a display information computer executable analysis part that analyzes response information to inquiry information by the computer executable inquiry part, and generates image information having a content to be easily understood.

11. The computer according to claim 10, wherein the display information computer executable analysis part generates the image information as a graph representing documents and features of the documents handled by an arbitrary operator, among documents generated in a job conducted by the plurality of operators.

12. The computer according to claim 1, further comprising a similar job computer executable search part that searches for similar jobs based on information extracted by the job feature computer executable extraction part.

13. The computer according to claim 1, further comprising a reference material automatic computer executable collection part that searches for similar jobs to a designated job and collects documents related to the similar jobs as reference materials.

14. The computer according to claim 1, further comprising an optimum operator computer executable selection part that selects optimum operators based on information extracted by the job feature computer executable extraction part.

15. The computer according to claim 1, further comprising a similar operator computer executable search part that searches for operators having similar roles based on information extracted by the job feature computer executable extraction part.

16. The computer according to claim 1, further comprising a key-person computer executable search part that detects an operator who played a leading role in a job handled by the plurality of operators.

17. The computer according to claim 1, further comprising a key-person computer executable search part that classifies features of documents generated by respective operators, extracted by the document feature computer executable extraction part, based on similarity, then searches for an operator who has been involved in many of classified items as a person who grasps the documents from a broad view, and determines the operator who has been involved in many of classified items as a key person who played a leading role in a job handled by the plurality of operators.

18. The computer according to claim 1, further comprising a key-person computer executable search part that classifies features of documents generated by respective operators, extracted by the document feature computer executable extraction part, based on similarity, then searches for an operator who has been involved in many of classified items as a technical leader, and determines the operator who has been involved in many of classified items as a key person who played a leading role in a job handled by the plurality of operators.

19. The computer according to claim 1, further comprising a similar job computer executable search part that searches for similar jobs based on information extracted by the job feature computer executable extraction part.

20. The computer according to claim 1, wherein the plurality of documents are authored by the same operator.

21. A computer-readable recording medium containing an optimum operator selection support program, the program causing a computer to function as:

a document computer executable management part that manages a plurality of documents related to a plurality of jobs, with additional information on a plurality of operators who generated the plurality of documents;

a document feature computer executable extraction part that extracts operator-specific documents generated by one of the plurality of operators from the document computer executable management part, and extracts a plurality of features of the operator-specific documents for the one of the plurality of operators; and a job feature computer executable extraction part that extracts job features from the plurality of features by detecting common features based on a frequency of occurrence of terms in the operator-specific documents extracted by the document feature computer executable extraction part, wherein the document computer executable management part identifies an operator as the optimum operator for an assigned task based on the job features;

a job structure computer executable generation part that generates a structure representing roles of the plurality of operators related to a job, wherein the job structure computer executable generation part generates an association diagram showing the job based on roles in the job, and describes the roles of the plurality of operators and features extracted from generated documents in the association diagram.

* * * * *